(12) United States Patent
Ishii

(10) Patent No.: US 10,964,939 B2
(45) Date of Patent: Mar. 30, 2021

(54) POSITIVE ELECTRODE FOR ELECTROCHEMICAL DEVICE AND ELECTROCHEMICAL DEVICE, AND METHOD FOR MANUFACTURING SAME

(71) Applicant: Panasonic Intellectual Property Management Co., Ltd., Osaka (JP)

(72) Inventor: Kiyohiro Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 16/476,543

(22) PCT Filed: Jan. 25, 2018

(86) PCT No.: PCT/JP2018/002274
§ 371 (c)(1),
(2) Date: Jul. 8, 2019

(87) PCT Pub. No.: WO2018/143048
PCT Pub. Date: Aug. 9, 2018

(65) Prior Publication Data
US 2019/0334166 A1    Oct. 31, 2019

(30) Foreign Application Priority Data
Jan. 31, 2017   (JP) .............................. JP2017-015868

(51) Int. Cl.
*C08L 65/00*    (2006.01)
*C08L 79/02*    (2006.01)
(Continued)

(52) U.S. Cl.
CPC ............. *H01M 4/366* (2013.01); *C08L 65/00* (2013.01); *C08L 79/02* (2013.01); *H01M 4/606* (2013.01);
(Continued)

(58) Field of Classification Search
None
See application file for complete search history.

(56) References Cited

U.S. PATENT DOCUMENTS

2004/0131934 A1\* 7/2004 Sugnaux ............... H01M 4/362
429/209
2014/0186703 A1 7/2014 Ando et al.

FOREIGN PATENT DOCUMENTS

JP     61-245468     10/1986
JP     2014-130706    7/2014

OTHER PUBLICATIONS

International Search Report of PCT application No. PCT/JP2018/002274 dated Apr. 24, 2018.

\* cited by examiner

*Primary Examiner* — Haroon S. Sheikh
(74) *Attorney, Agent, or Firm* — McDermott Will and Emery LLP

(57) ABSTRACT

A positive electrode for electrochemical device includes a positive current collector and a positive electrode material layer supported on the positive current collector. The positive electrode material layer includes a positive electrode active material. The positive electrode active material includes an inner core portion containing polyaniline and a surface layer portion containing poly(3,4-ethylenedioxythiophene) and polythiophene. The inner core portion is fibrous or grain-aggregate, and the surface layer portion covers at least a part of the inner core portion. Furthermore, an electrochemical device includes the above-described positive electrode, a negative electrode including a negative electrode material layer that occludes and releases a lithium ion, and a nonaqueous electrolytic solution having lithium ion conductivity.

9 Claims, 3 Drawing Sheets

(51) Int. Cl.
*H01M 10/0525* (2010.01)
*H01M 4/36* (2006.01)
*H01M 4/60* (2006.01)
*H01M 4/62* (2006.01)
*H01M 4/02* (2006.01)

(52) U.S. Cl.
CPC ....... *H01M 4/624* (2013.01); *H01M 10/0525* (2013.01); *C08L 2203/20* (2013.01); *C08L 2207/53* (2013.01); *H01M 2004/021* (2013.01); *H01M 2004/028* (2013.01)

POSITIVE ELECTRODE FOR ELECTROCHEMICAL DEVICE AND ELECTROCHEMICAL DEVICE, AND METHOD FOR MANUFACTURING SAME

TECHNICAL FIELD

The present invention relates to a positive electrode for electrochemical device, which contains a conductive polymer, and an electrochemical device using the same.

BACKGROUND

In recent years, electrochemical devices having intermediate performance between a lithium ion secondary battery and an electric double layer capacitor attract attention. For example, use of a conductive polymer as a positive electrode material has been investigated. Since electrochemical devices containing, as a positive electrode material, a conductive polymer are charged and discharged by adsorption of anions (doping) and desorption of anions (dedoping), these devices have a small reaction resistance. Thus, the electrochemical devices have a higher output than general lithium ion secondary batteries.

The positive electrode containing a conductive polymer is fabricated by forming a conductive polymer layer on the surface of a positive current collector. Unexamined Japanese Patent Publication No. 2014-130706 teaches that polyaniline is used as a conductive polymer. Unexamined Japanese Patent Publication No. 61-245468 teaches that a polymer complex of polyaniline and polypyrrole and/or polythiophene is used as a conductive polymer.

SUMMARY

The applications and use conditions of electrochemical devices are expanded, and the required properties are also highly-diversified. The capacitane of electrochemical device is likely to be affected particularly by the temperature conditions used and tends to decrease as the temperature decreases. For this reason, improvement in the low temperature properties of electrochemical device is demanded. However, when the positive electrodes containing a conductive polymer, which are taught in Unexamined Japanese Patent Publication No. 2014-130706 and Unexamined Japanese Patent Publication No. 61-245468 are used, the capacitance of electrochemical device decreases or the internal resistance increases at low temperatures.

In view of the above, a positive electrode for electrochemical device according to an aspect of the present invention includes a positive current collector and a positive electrode material layer supported on the positive current collector. The positive electrode material layer includes a positive electrode active material. The positive electrode active material includes an inner core portion containing polyaniline and a surface layer portion containing poly(3,4-ethylenedioxythiophene) and polythiophene. The inner core portion is fibrous or grain-aggregate, and the surface layer portion covers at least a part of the inner core portion.

An electrochemical device according to another aspect of the present invention includes the above-described positive electrode, a negative electrode including a negative electrode material layer that occludes and releases a lithium ion, and a nonaqueous electrolytic solution having lithium ion conductivity.

A method for manufacturing a positive electrode for electrochemical device according to still another aspect of the present invention includes an inner core portion forming step and a surface layer portion forming step. The inner core portion forming step is forming an inner core portion containing polyaniline on a positive current collector by using a first solution containing aniline. The inner core portion is fibrous or grain-aggregate. The surface layer portion forming step is forming a surface layer portion containing poly(3,4-ethylenedioxythiophene) and polythiophene by using a second solution containing 3,4-ethylenedioxythiophene and thiophene after the inner core portion forming step. The surface layer portion covers at least a part of the inner core portion.

A method for manufacturing an electrochemical device that includes a positive electrode having a positive current collector and a positive electrode material layer supported on the positive current collector, a negative electrode including a negative electrode material layer that occludes and releases a lithium ion, and a nonaqueous electrolytic solution having lithium ion conductivity according to yet another aspect of the present invention includes a step of forming the positive electrode. The step of forming the positive electrode includes an inner core portion forming step and a surface layer portion forming step. The inner core portion forming step is forming an inner core portion containing polyaniline on the positive current collector by using a first solution containing aniline. The inner core portion is fibrous or grain-aggregate. The surface layer portion forming step is forming a surface layer portion containing poly(3,4-ethylenedioxythiophene) and polythiophene in the nonaqueous electrolytic solution containing 3,4-ethylenedioxythiophene and thiophene after the inner core portion forming step. The surface layer portion covers at least a part of the inner core portion.

According to the present invention, the low temperature properties of electrochemical device can be improved.

DESCRIPTION OF EMBODIMENT

Charging and discharging of an electrochemical device containing a conductive polymer as a positive electrode material are performed by adsorption (doping) and desorption (dedoping) of anions in the nonaqueous electrolytic solution by the conductive polymer in the positive electrode and adsorption (doping) and desorption (doping) of cations in the nonaqueous electrolytic solution by the negative electrode material in the negative electrode. At low temperatures, since the viscosity of the nonaqueous electrolytic solution increases, the amount of anions supplied to the vicinity of the positive electrode (particularly, conductive polymer) decreases, and thus the reaction sites decrease. For this reason, the capacitance of electrochemical device decreases or the internal resistance increases. Hence, the low temperature properties of electrochemical device are likely to deteriorate. In the methods of Unexamined Japanese Patent Publication No. 201-130706 and Unexamined Japanese Patent Publication No. 61-245468, it is considered that a decrease in amount of anions supplied at low temperatures greatly affects the low temperature properties of electrochemical device because the amount of conductive polymer in the positive electrode is not sufficient.

Hence, in the present invention, the positive electrode active material is constituted by a grain-aggregate or fibrous inner core portion and a surface layer portion covering at least a part of the inner core portion. The surface layer portion is formed on the surface of the inner core portion so as to fill the gap between the inner core portions. And thus the amount of conductive polymer in the positive electrode active material increases. This compensates for a decrease of reaction sites at low temperatures and improves the low temperature properties. At this time, the amount of conductive polymer in the surface layer portion is likely to increase when the surface layer portion contains poly(3,4-ethylenedioxythiophene) (hereinafter referred to as PEDOT), which has large steric hindrance in a molecular structure, and polythiophene further attaches to the surface layer portion. This is because sites (gap) to which polythiophene is likely to adhere is formed on the surface layer portion by the large steric hindrance of PEDOT. PEDOT is also excellent in improving the durability of positive electrode active material. In other words, the low temperature properties as well as the durability of electrochemical device are improved by configuring the positive electrode active material as described above.

(Positive Electrode)

Figure 1:
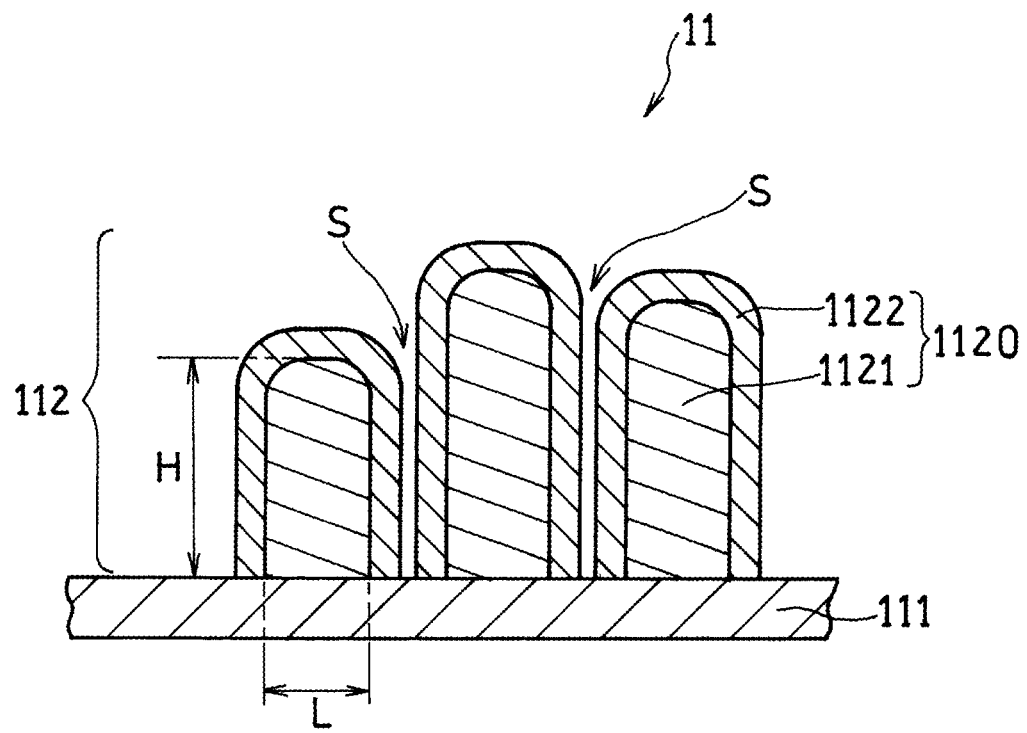
FIG. 1 is a conceptual view illustrating a cross section of a positive electrode that includes a positive electrode active material having a fibrous inner core portion according to an exemplary embodiment of the present invention.

The cross section of positive electrode 11 that includes positive electrode active material 1120 having fibrous inner core portion 1121 is conceptually illustrated in FIG. 1. Positive electrode for electrochemical device 11 includes positive current collector 111 and positive electrode material layer 112 supported on positive current collector 111. Positive electrode material layer 112 includes positive electrode active material 1120 having grain-aggregate or fibrous inner core portion 1121 and surface layer portion 1122 covering at least a part of inner core portion 1121. Inner core portion 1121 contains polyaniline, and surface layer portion 1122 contains PEDOT and polythiophene. Polyaniline, PEDOT, and polythiophene are all π-electron conjugated polymers and are conductive polymers which exhibit excellent conductivity by being doped with an anion (dopant).

Inner core portion 1121 has a fibrous or grain-aggregate shape. Grain-aggregate refers to a state in which a plurality of particulate substances are linked to one another. Inner core portion 1121 is formed so as to extend at least in the thickness direction of positive current collector 111. In other words, as illustrated in FIG. 1, in the cross section in the thickness direction of positive electrode 11, distance H from positive current collector 111 to the end portion of inner core portion 1121 is longer than distance (width) L of the bonding area between positive current collector 111 and inner core portion 1121 (distance H>distance L). A plurality of inner core portions 1121 having such a shape is supported on the surface of positive current collector 111, and gap S is formed between inner core portions 1121. Here, distance H is the length from a main surface of positive current collector 111 to the most distant part of inner core portion 1121 in a normal direction to the main surface of positive current collector 111. Further, distance L is the maximum length in a bonding area between the main surface of positive current collector 111 and inner core portion 1121 in a direction parallel to the main surface of positive current collector 111.

Polyaniline has a linear structure, for example, as represented by the following Chemical Formula (1). Meanwhile, PEDOT has a structure having large steric hindrance, for example, as represented by the following Chemical Formula (2). Gap S between inner core portions 1121 varies in size. For this reason, PEDOT hardly adheres to the surface of inner core portion 1121 facing small gap S. In other words, PEDOT adheres to inner core portion 1121 until relatively large gap S is filled to some extent. Meanwhile, PEDOT forms a gap to which polythiophene adheres.

[Chemical Formula 1]

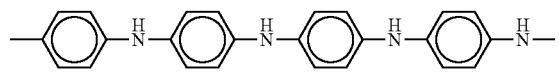

(1)

[Chemical Formula 2]

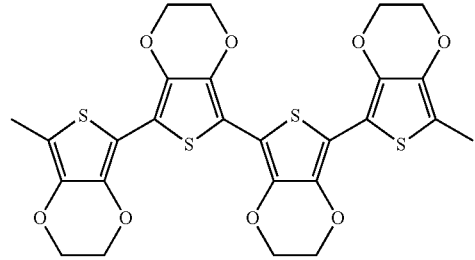

(2)

Polythiophene has a linear structure, for example, as represented by the following Chemical Formula (3). For this reason, polythiophene adheres to the gap formed by PEDOT and the surface of inner core portion 1121 facing small gap S to which PEDOT cannot adhere. By this, inner core portion 1121 is covered with a sufficient amount of conductive polymer. Here, surface layer portion 1122 is formed mostly along the shape of inner core portion 1121 so as to cover at least a part of the surface of inner core portion 1121. For this reason, positive electrode active material 1120 maintains a fibrous or grain-aggregate shape, and positive electrode material layer 112 has a porous structure. Hence, the surface area of positive electrode material layer 112 is large.

[Chemical Formula 3]

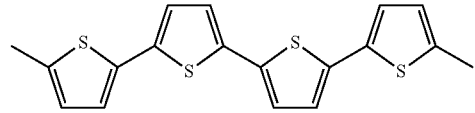

(3)

Polyaniline contained in inner core portion 1121 may have a substituent (for example, an alkyl group) in a range in which the function thereof is not inhibited. PEDOT and polythiophene contained in surface layer portion 1122 may also have a substituent (for example, an alkyl group) in a range in which the functions thereof are not inhibited. The weight average molecular weights of polyaniline, PEDOT, and polythiophene are not particularly limited but each range, for example, from 1,000 to 100,000, inclusive.

It can be evaluated whether or not inner core portion 1121 is covered with a sufficient amount of conductive polymer while the porous structure of positive electrode material layer 112 is maintained by, for example, measuring the arithmetic mean roughness Ra of positive electrode 11. When the arithmetic mean roughness Ra of positive electrode 11 ranges from 0.4 μm to 1.5 μm, inclusive, it can be evaluated that inner core portion 1121 is covered with a sufficient amount of conductive polymer while the porous structure of positive electrode material layer 112 is maintained. The arithmetic mean roughness Ra more preferably ranges from 0.5 μm to 1.0 μm, inclusive. The arithmetic mean roughness Ra is measured in conformity to JIS B0601: 2013.

The volume of inner core portion 1121 is preferably more than or equal to the volume of surface layer portion 1122. When surface layer portion 1122 is formed thin, the shape feature of inner core portion 1121 is likely to be maintained, and the surface area of positive electrode material layer 112 increases. The relationship between the volume of inner core portion 1121 and the volume of surface layer portion 1122 can be determined from the cross-sectional photograph of positive electrode 11. For example, the cross section of positive electrode 11 may be photographed using a scanning electron microscope (SEM), the cross-sectional photograph may be binarized, the cross-sectional area ($S_{in}$) of inner core portion 1121 and the cross-sectional area ($S_{out}$) of surface layer portion 1122 may be respectively measured, and then these may be compared with each other. At this time, $S_{in}$ is preferably 1 to 10000 times larger than $S_{out}$ and more preferably 3 to 100 times larger than $S_{out}$. Alternatively, the magnitude relationship between the volume of inner core portion 1121 and the volume of surface layer portion 1122 can be analyzed by electron spectroscopy for chemical analysis (ESCA), attenuated total reflection (ATR)/Fourier transform infrared spectroscopy (FT-IR) and the like.

A mass ratio of PEDOT to polythiophene (a mass ratio of PEDOT/polythiophene) in surface layer portion 1122 ranges preferably from 0.02 to 20, inclusive, and more preferably from 0.08 to 10, inclusive. When the mass ratio is within the above range, the durability as well as the low temperature properties of the electrochemical device can be improved. The mass ratio may be calculated, for example, from the mass ratio of EDOT to thiophene which are used to form surface layer portion 1122.

Figure 2:
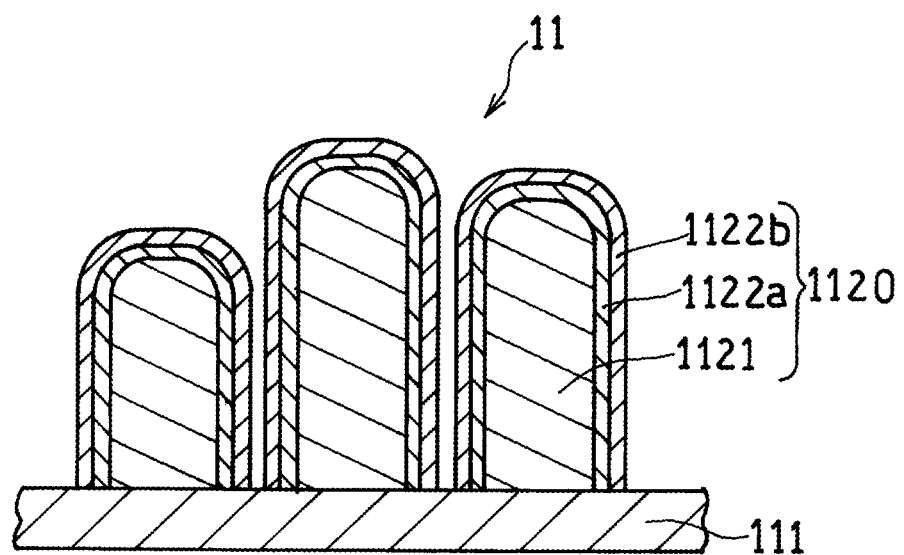
FIG. 2 is a conceptual view illustrating a cross section of a positive electrode that includes a positive electrode active material having a fibrous inner core portion according to another exemplary embodiment of the present invention.

PEDOT and polythiophene may each form a layer as illustrated in FIG. 2. In this case, it is preferable that inner core portion 1121 is covered with layer (PEDOT layer) 1122a containing PEDOT and layer (polythiophene layer) 1122b containing polythiophene, which are disposed in this order. By forming a layer containing bulky PEDOT first, a sufficient amount of PEDOT can be attached to inner core portion 1121, and thus the durability of the electrochemical device is likely to be improved. Here, as to be described later, in the case of performing the polymerization by electrolytic polymerization in a solution (second solution) containing EDOT and thiophene, inner core portion 1121 is likely to be covered with PEDOT layer 1122a and polythiophene layer 1122b which are disposed in this order since PEDOT, which has a low polymerization potential, is first generated.

Inner core portion 1121 may contain a conductive polymer (hereinafter, referred to as a fourth conductive polymer) other than polyaniline in a range in which the function of polyaniline is not inhibited. However, a proportion of the fourth conductive polymer in inner core portion 1121 is preferably 10% by mass or less. The fourth conductive polymer is not particularly limited, and examples thereof include organic polysulfide compounds and π-electron conjugated polymers other than polyaniline. Surface layer portion 1122 may contain a conductive polymer (hereinafter, referred to as a fifth conductive polymer) other than PEDOT and polythiophene in a range in which the functions of PEDOT and polythiophene are not inhibited. However, a proportion of the fifth conductive polymer in surface layer portion 1122 is preferably 10% by mass or less. The fifth conductive polymer is not particularly limited, and examples thereof include organic polysulfide compounds and π-electron conjugated polymers other than PEDOT and polythiophene.

The organic polysulfide compound is a general term for compounds having a —S—S— bond, and examples thereof include chain or cyclic disulfide compounds and trisulfide compounds. Examples of the π-electron conjugated polymer include homopolymers and/or copolymers of at least one kind of polymerizable compound selected from the group consisting of aniline, pyrrole, thiophene, furan, thiophene vinylene, pyridine, and derivatives thereof. These may be contained singly or plural kinds thereof may be contained.

For positive current collector 111, for example, a conductive sheet material is used. As the sheet material, a metal foil, a metal porous body, a perforated metal and the like are used. As the material for positive current collector 111, aluminum, an aluminum alloy, nickel, titanium and the like can be used.

<Method for Manufacturing Positive Electrode and Electrochemical Device>

Next, an example of a method for manufacturing a positive electrode for electrochemical device and an electrochemical device will be described. The manufacturing method, however, is not limited to the following.

Positive electrode 11 is manufactured by, for example, a method including (1) an inner core portion forming step of forming fibrous or grain-aggregate inner core portion 1121 containing polyaniline on positive current collector 111 using a first solution containing aniline and (2) a surface layer portion forming step of forming surface layer portion 1122 which contains PEDOT and polythiophene and covers at least a part of inner core portion 1121 using a second solution containing EDOT and thiophene after the inner core portion forming step.

(1) Inner Core Portion Forming Step

First, aniline is polymerized in a state in which positive current collector 111 is immersed in the first solution to form fibrous or grain-aggregate inner core portion 1121 on the surface of positive current collector 111. The polymerization method of aniline may be electrolytic polymerization or chemical polymerization, but electrolytic polymerization is preferable because of easily controlling the shape of inner core portion 1121. The shape of inner core portion 1121 is controlled by the polymerization conditions (temperature, concentration of aniline, current density for electrolysis, and the like) and the like in the first solution.

Before positive current collector 111 is immersed in the first solution, the surface of positive current collector 111 may be etched and roughened or a conductive carbon layer may be formed on the surface of positive current collector 111. For example, if positive current collector 111 is an aluminum foil, it is desirable to apply a carbon paste to the surface of the aluminum foil, to dry the carbon paste, and thus to form a conductive carbon layer. The carbon paste can be obtained by dispersing carbon black and a resin component in water or in an organic solvent.

Thereafter, by immersing positive current collector 111 in the first solution so as to face a counter electrode and allowing a current to flow between positive current collector 111 serving as an anode and the counter electrode, inner core portion 1121 containing polyaniline is formed so as to cover at least a part of the surface of positive current collector 111 or the conductive carbon layer.

An anion (hereinafter referred to as a first anion) serving as a dopant may be present in the first solution, and inner core portion 1121 which contains polyaniline doped with the first anion may be formed. Examples of the first anion include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl)imide ion ($N(FSO_2)_2^-$), and a bis(trifluoromethanesulfonyl)imide ion ($N(CF_3SO_2)_2^-$). These may be used singly or in combination of two or more kinds thereof.

As a solvent (hereinafter referred to as the first solvent) of the first solution, water may be used or an organic solvent may be used in consideration of the solubility of aniline. As the organic solvent, alcohols (for example, ethyl alcohol, methyl alcohol, isopropyl alcohol, ethylene glycol, and propylene glycol), acetonitrile, propylene carbonate (PC) and the like can be used. The first solvent may be a mixture of water and an alcohol. Among these, the first solvent is preferably water from the perspective of handing and cost. An oxidizing agent which promotes the electrolytic polymerization may be added to the first solution.

It is preferable that the first solution is controlled so as to have a pH ranging from 0 to 6 and a temperature ranging from 0° C. to 45° C. The current density is not particularly limited but preferably ranges from 0.1 mA/cm² to 100 mA/cm², inclusive. A concentration of aniline in the first solution preferably ranges from 0.01 mol/L to 3 mol/L, inclusive. A concentration of first anion in the first solution preferably ranges from 0.01 mol/L to 3 mol/L, inclusive.

After inner core portion 1121 is formed, positive current collector 111 on which inner core portion 1121 is formed is taken out from the first solution, washed to remove the unreacted aniline, and dried.

(2) Surface Layer Portion Forming Step

Next, positive current collector 111 on which inner core portion 1121 is formed is immersed in the second solution and surface layer portion 1122 which covers at least a part of inner core portion 1121 is formed. Surface layer portion 1122 is formed by respectively polymerizing EDOT and thiophene. The polymerization method of EDOT and thiophene may be electrolytic polymerization or chemical polymerization, but electrolytic polymerization is preferable. In the case of electrolytic polymerization, the thickness of surface layer portion 1122 can be easily controlled by the current density for electrolysis and the polymerization time as well as PEDOT and polythiophene can be respectively synthesized using the second solution containing EDOT and thiophene.

Surface layer portion 1122 is formed so as to cover at least a part of the surface of inner core portion 1121 by allowing positive current collector 111 having inner core portion 1121 to face the counter electrode and allowing a current to flow between positive current collector 111 serving as an anode and the counter electrode.

A second anion serving as a dopant may be present in the second solution and surface layer portion 1122 doped with the dopant may be formed. As the second anion, the same ones as the first anion can be exemplified. Among these, as the second anion, an oxoacid anion containing a halogen atom, an imide anion and the like are preferable. The oxoacid anion containing a halogen atom is preferably a tetrafluoroborate anion ($BF_4^-$), a hexafluorophosphate anion ($PF_6^-$), a perchlorate anion ($ClO_4^-$), a fluorosulfate anion ($FSO_3^-$) and the like. The imide anion is preferably a bis(fluorosulfonyl)imide anion ($N(FSO_2)_2^-$). These may be used singly or in combination of two or more kinds thereof.

As a solvent (hereinafter referred to as the second solvent) of the second solution, water may be used or an organic solvent may be used. Among these, an organic solvent is preferable from the viewpoint of the solubility of EDOT and thiophene. Here, as the organic solvent, alcohols as described above are preferable. In addition, an oxidizing agent which promotes the electrolytic polymerization may be added to the second solution.

It is preferable that the second solution is controlled so as to have a pH ranging from 0 to 6 and a temperature ranging from 0° C. to 45° C. The current density is not particularly limited but preferably ranges from 0.1 mA/cm² to 100 mA/cm², inclusive. A concentration of second anion in the second solution preferably ranges from 0.01 mol/L to 3 mol/L, inclusive. At this time, surface layer portion 1122 can be formed thin by shortening the time for electrolytic polymerization. In addition, the current density ($I_2$) in the second aqueous solution may be set to be lower than the current density ($I_1$) in the first solution. It is preferable that 12 is controlled to be from 1% to 100% of $I_1$.

A concentration of EDOT in the second solution ranges preferably from 0.1% to 1% by mass, inclusive, and more preferably from 0.25% to 0.75% by mass, inclusive. A concentration of thiophene in the second solution ranges preferably from 0.05% to 4% by mass, inclusive, and more preferably from 0.08% to 3% by mass, inclusive. By setting the concentrations of EDOT and thiophene to the above ranges and forming surface layer portion 1122, it is possible to sufficiently attach polythiophene to inner core portion 1121 while attaching a sufficient amount of PEDOT to inner core portion 1121. This improves the durability as well as further improves the low temperature properties of the electrochemical device to be obtained. Furthermore, the self-discharging properties are also improved.

After surface layer portion 1122 is formed, positive current collector 111 having positive electrode material layer 112 that includes inner core portion 1121 and surface layer portion 1122 is taken out from the second solution, washed to remove the unreacted second monomers, and dried, whereby positive electrode 11 can be obtained.

Surface layer portion 1122 may be formed in the nonaqueous electrolytic solution. In other words, the second solution may be a nonaqueous electrolytic solution. In this case, for example, a precursor of an electrode group is prepared by using the positive current collector (positive electrode precursor) on which inner core portion 1121 is formed, a negative electrode, and a separator. And then, this is accommodated in a container together with a nonaqueous electrolytic solution containing EDOT and thiophene. After that, a voltage is applied between the positive electrode precursor and the negative electrode. At this time, the applied voltage is changed depending on the polymerization potential of EDOT and thiophene. For example, a voltage ranging from 3.6 V to 3.8 V is applied between the positive electrode precursor and the negative electrode to polymerize EDOT. After that, the voltage is raised to about 4.2 V to polymerize thiophene. By this, an electrochemical device is obtained as well as surface layer portion 1122 containing PEDOT and polythiophene is formed.

As the anion (dopant) contained in the second solution which is a nonaqueous electrolytic solution, $PF_6^-$ is preferable since the conductive polymer is easily reversibly doped with and dedoped from the anion. $PF_6^-$ may account for 90% by mole or more of all the anions contained in the nonaqueous electrolytic solution in the charged state and the discharged state.

As the nonaqueous solvent of the nonaqueous electrolytic solution, it is possible to use cyclic carbonates such as ethylene carbonate, propylene carbonate (PC), and butylene carbonate, chain carbonates such as dimethyl carbonate (DMC), diethyl carbonate, and ethyl methyl carbonate, aliphatic carboxylic acid esters such as methyl formate, methyl acetate, methyl propionate, and ethyl propionate, lactones such as γ-butyrolactone and γ-valerolactone, chain ethers such as 1,2-dimethoxyethane (DME), 1,2-diethoxyethane (DEE), and ethoxymethoxyethane (EME), cyclic ethers such as tetrahydrofuran and 2-methyltetrahydrofuran, dimethylsulfoxide, 1,3-dioxolane, formamide, acetamide, dimethylformamide, dioxolane, acetonitrile, propionitrile, nitromethane, ethyl monoglyme, trimethoxymethane, sulfolane, methylsulfolane, 1,3-propanesultone and the like. These may be used singly or in combination of two or more kinds thereof. Among these, a mixed solvent containing DMC and PC is preferable from the viewpoint of ion conductivity. It is preferable that DMC and PC account for 50% by mass or more and further 80% by mass or more of the solvent. At this time, a volume ratio of DMC to PC (a volume ratio of DMC/PC) may be, for example, 30/70 to 70/30.

In positive electrode 11 obtained by the method as described above, fibrous or grain-aggregate positive electrode active material 1120 is formed directly on positive current collector 111 (that is, in a state of conducting with positive current collector 111) and respective positive electrode active materials 1120 are electrically connected with each other. Hence, positive electrode material layer 112 is not required to internally contain a conductive agent such as conductive carbon in order to form a conductive path.

Here, a case in which each conductive polymer is synthesized by electrolytic polymerization has been described above, but the conductive polymers may be synthesized by chemical polymerization. In this case, after PEDOT is attached to inner core portion 1121 using a polymerization liquid containing EDOT, polythiophene may be attached to inner core portion 1121 or PEDOT using a polymerization liquid containing thiophene.

In a case in which both the first solution and the second solution used in the surface layer portion forming step contain an anion (dopant), and at least the anion contained in the second solution (hereinafter referred to as the second anion) among the first anion and the second anion is not involved in the charging and discharging of the electrochemical device, it is preferable to reduce the conductive polymer of positive electrode material layer 112 so that at least the second anion is dedoped from the conductive polymer after the surface layer portion forming step. By this, the amount of anions with which the conductive polymer can be doped during the charging of the electrochemical device increases and the capacitance is likely to increase.

Meanwhile, in a case in which only the first anion is not involved in the charging and discharging of the electrochemical device, it is preferable to perform a dedoping step of reducing polyaniline to cause the first anion to be dedoped from polyaniline after the inner core portion forming step and before the surface layer portion forming step. This dedoping step increases the amount of anions (second anions) with which the conductive polymer can be doped during the charging of the electrochemical device.

(Electrochemical Device)

Figure 3:
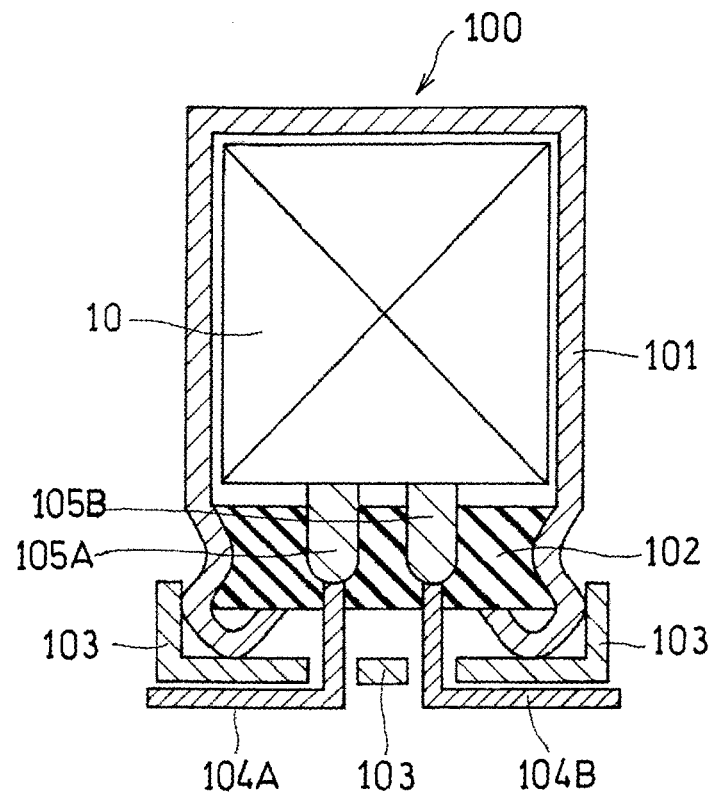
FIG. 3 is a schematic cross-sectional view illustrating an electrochemical device according to an exemplary embodiment of the present invention.

Next, a case in which the electrochemical device is a lithium ion battery will be specifically described with reference to FIGS. 3 and 4, but the electrochemical device is not limited to this. FIG. 3 is a schematic cross-sectional view illustrating an example of the electrochemical device, and FIG. 4 is a schematic developed view illustrating a part of the electrochemical device of FIG. 3.

Electrochemical device 100 according to the present exemplary embodiment includes positive electrode 11, negative electrode 12, and a nonaqueous electrolytic solution (not illustrated). Such electrochemical device 100 is manufactured by the method described for a case in which the second solution is a nonaqueous electrolytic solution. In a case in which electrochemical device 100 is a lithium ion battery, negative electrode 12 includes a negative electrode material layer which occludes and releases lithium ions, and the nonaqueous electrolytic solution exhibits lithium ion conductivity.

Figure 4:
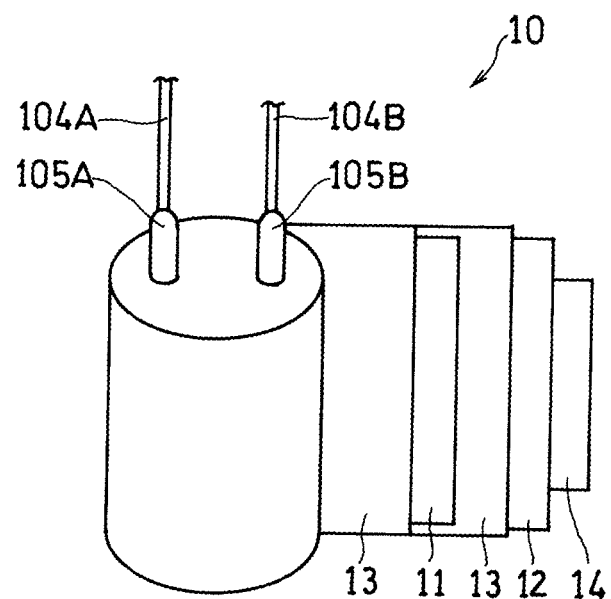
FIG. 4 is a view for explaining the configuration of the electrochemical device according to the exemplary embodiment of FIG. 3.

As illustrated in FIG. 4, positive electrode 11 and negative electrode 12 are wound with separator 13 interposed therebetween to constitute electrode group 10 which is a wound body. The outermost periphery of the wound body is fixed by fastening tape 14. Positive electrode 11 is connected to lead tab 105A, and negative electrode 12 is connected to lead tab 105B. Electrochemical device 100 includes electrode group 10, a nonaqueous electrolytic solution, container 101 accommodating electrode group 10, sealing body 102 for closing the opening of container 101, and lead wires 104A, 104B led from sealing body 102. Lead wires 104A, 104B are connected to lead tabs 105A, 105B, respectively. Sealing body 102 is formed of, for example, an elastic material containing a rubber component. The vicinity of the opening end of container 101 is drawn inward, and the opening end is curled so as to swage sealing body 102.

(Negative Electrode)

Negative electrode 12 has, for example, a negative electrode material layer containing a negative electrode active material. The negative electrode material layer is generally supported on a negative current collector. For the negative current collector, for example, a conductive sheet material is used. As the sheet material, a metal foil, a metal porous body, a perforated metal and the like are used. As the material for the negative current collector, copper, a copper alloy, nickel, stainless steel and the like can be used.

Examples of the negative electrode active material include carbon materials, metal compounds, alloys, and ceramic materials. The carbon material is preferably graphite, hardly graphitizable carbon (hard carbon) or easily graphitizable carbon (soft carbon), particularly preferably graphite or hard carbon. Examples of the metal compound include silicon oxides and tin oxides. Examples of the alloy include silicon alloys and tin alloys. Examples of the ceramic material include lithium titanate and lithium manganate. These may be used singly or in combination of two or more kinds thereof. Among these, carbon materials are preferable from the perspective of being able to lower the potential of negative electrode 12.

The negative electrode material layer preferably contains, in addition to the negative electrode active material, a conductive agent, a binder and the like. Examples of the conductive agent include carbon black and a carbon fiber. Examples of the binder include a fluororesin, an acrylic resin, a rubber material, and a cellulose derivative. Examples of the fluororesin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include styrene-butadiene rubber, and examples of the cellulose derivative include carboxymethyl cellulose.

Negative electrode 12 is preferably pre-doped with lithium ions in advance. This decreases the potential of negative electrode, thus a difference in potential (namely, voltage) between the positive electrode and the negative electrode increases and the energy density of electrochemical device 100 is improved.

Pre-doping of negative electrode 12 with lithium ions proceeds, for example, by the following manner: a metal lithium layer serving as a lithium ion supply source is formed on the surface of the negative electrode material layer, lithium ions elute from the metal lithium layer into the nonaqueous electrolytic solution, and the eluted lithium ions are occluded in the negative electrode active material. For example, in a case in which graphite or hard carbon is used as the negative electrode active material, lithium ions are inserted into between the layers of graphite or into the pores of hard carbon. The amount of lithium ions with which the negative electrode is pre-doped can be controlled by the mass of the metal lithium layer.

The step of pre-doping negative electrode 12 with lithium ions may be performed before electrode group 10 is assembled or may be performed after electrode group 10 is accommodated in container 101 of electrochemical device 100 together with the nonaqueous electrolytic solution. In this case, the metal lithium film may be formed on the surface of negative electrode 12 (negative electrode material layer) in advance, and then electrode group 10 may be fabricated.

The negative electrode material layer of negative electrode 12 is formed by preparing a negative electrode mixture paste in which a negative electrode active material, a conductive agent, a binder and the like are mixed together with a dispersion medium, and applying the negative electrode mixture paste to the negative current collector, for example.

(Nonaqueous Electrolytic Solution)

The nonaqueous electrolytic solution exhibiting lithium ion conductivity contains a nonaqueous solvent as described above and a lithium salt dissolved in the solvent. The lithium salt contains anions with which the conductive polymer is doped at the time of charging and lithium ions to be occluded in the negative electrode active material at the time of charging.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. One kind of these may be used singly, or two or more kinds thereof may be used in combination. Among these, it is preferable to use at least one kind selected from the group consisting of lithium salts having an oxoacid anion containing a halogen atom and lithium salts having an imide anion. A concentration of lithium salt in the nonaqueous electrolytic solution in the charged state (the charging rate (state of charge (SOC)): 90% to 100%) ranges, for example, from 0.2 mol/L to 5 mol/L, inclusive.

The nonaqueous electrolytic solution may contain additives if necessary. For example, an unsaturated carbonate such as vinylene carbonate, vinyl ethylene carbonate or divinyl ethylene carbonate may be added as an additive for forming a coating film exhibiting high lithium ion conductivity on the surface of negative electrode 12.

(Separator)

As separator 13, for example, nonwoven fabrics made of cellulose fibers, nonwoven fabrics made of glass fibers, microporous films made of polyolefins, woven fabrics, and nonwoven fabrics are used. The thickness of separator 13 ranges, for example, from 10 μm to 300 μm, inclusive, and preferably from 10 μm to 40 μm, inclusive.

In the exemplary embodiments described above, wound electrochemical device 100 having a cylindrical shape has been described, but the application range of the present invention is not limited to the wound electrochemical device, and the present invention can also be applied to a square-shaped or laminate electrochemical device.

EXAMPLES

Hereinafter, the present invention will be described in more detail with reference to Examples. The present invention, however, is not limited to Examples.

Example 1

(1) Fabrication of Positive Electrode Precursor

An aluminum foil having a thickness of 30 μm was prepared as a positive current collector. Meanwhile, an aqueous aniline solution containing aniline and sulfuric acid was prepared.

Figure 5:
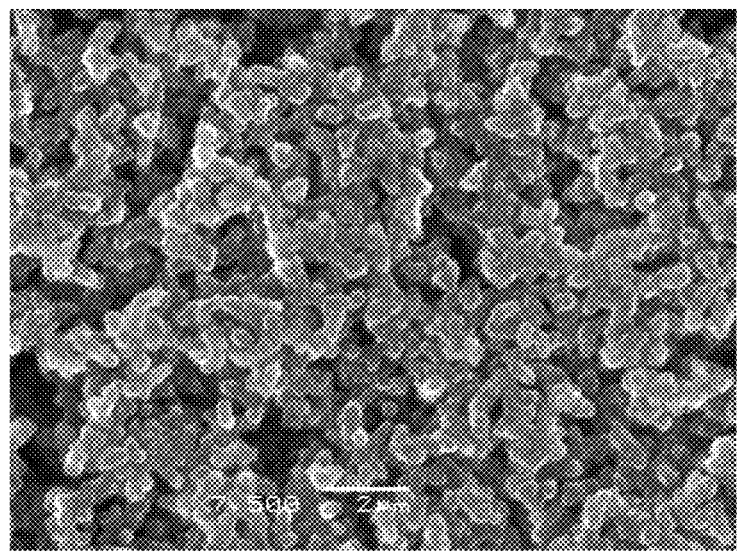
FIG. 5 is a scanning electron microphotograph showing an inner core portion formed on a positive current collector in Example 1.

The positive current collector and the counter electrode were immersed in the aqueous aniline solution, and electrolytic polymerization was performed at a current density of 10 mA/cm$^2$ for 20 minutes. By this, polyaniline doped with sulfate ions ($SO_4^{2-}$) was attached to the entire back and front surfaces of the positive current collector to form an inner core portion. Thereafter, the polyaniline was reduced so that the sulfate ions were dedoped from the polyaniline. Subsequently, the positive current collector (positive electrode precursor) having the inner core portion was taken out from the first solution, washed, and dried. The SEM photograph of the positive electrode precursor, which is obtained taken in a normal direction to the main surface of the positive electrode precursor, is shown in FIG. 5. It can be seen from FIG. 5 that the inner core portion containing polyaniline has grown in a fibrous shape. Moreover, the arithmetic mean roughness Ra in the main surface of the positive electrode precursor was 1.569 μm.

(2) Fabrication of Negative Electrode

A copper foil having a thickness of 20 μm was prepared as a negative current collector. Meanwhile, a carbon paste was prepared by kneading a mixed powder containing 97 parts by mass of hard carbon, 1 part by mass of carboxycellulose, and 2 parts by mass of styrene-butadiene rubber with water at a ratio of 40:60 (mixed powder:water) as a weight ratio. The carbon paste was applied to both surfaces of the negative current collector and dried to obtain a negative electrode having a negative electrode material layer having a thickness of 35 μm on both surfaces. Next, a metal lithium layer in an amount calculated so that the negative electrode potential in the nonaqueous electrolytic solution after completion of pre-doping was less than or equal to 0.2 V with respect to metal lithium was formed on the negative electrode material layer.

(3) Fabrication of Precursor of Electrode Group

A lead tab was connected to each of the positive electrode precursor and the negative electrode. Thereafter, as illustrated in FIG. 4, a separator of a cellulose nonwoven fabric (thickness of 35 μm), the positive electrode precursor, and the negative electrode were alternately laminated one on another to obtain a stacked body. The stacked body was wound to form a precursor of an electrode group.

(4) Preparation of Nonaqueous Electrolytic Solution

A solvent was prepared by adding 0.2% by mass of vinylene carbonate to a mixture of PC and DMC having a volume ratio of 1:1. EDOT (concentration: 0.5% by mass), thiophene (concentration: 2% by mass), and LiPF$_6$ (predetermined concentration) as a lithium salt were dissolved in the solvent obtained to prepare a nonaqueous electrolytic solution containing PF$_6^-$ as an anion.

(5) Fabrication of Electrochemical Device (Formation of Surface Layer Portion)

The precursor of electrode group and the nonaqueous electrolytic solution were accommodated in a container having an opening, and an electrochemical device as illustrated in FIG. 3 was assembled. Thereafter, the surface layer portion was formed by performing aging at 25° C. for 2 hours while a charging voltage of 3.8 V was applied between the terminals of the positive electrode precursor and the negative electrode and then for 2 hours at a charging voltage of 4.2 V. Subsequently, aging was performed for 24 hours while a charging voltage of 3.8 V was applied to advance pre-doping of the negative electrode with lithium ions. Electrochemical device (A1) having a voltage across terminals of 3.2 V was thus completed.

Figure 6:
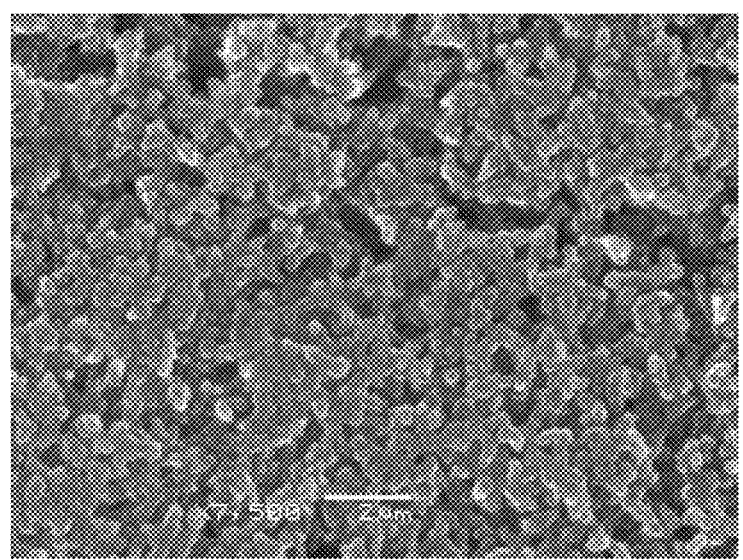
FIG. 6 is a scanning electron microphotograph showing an inner core portion formed on the positive current collector and a surface layer portion in Example 1.

The SEM photograph of the positive electrode, which is obtained taken in a normal direction to the main surface of the positive electrode, is shown in FIG. 6. The positive electrode material layer is configured of a fibrous positive electrode active material in which the shape feature of the inner core portion is maintained as it is, but the gap between the positive electrode active materials is smaller than that in FIG. 5. The thickness of the positive electrode material layer was 60 μm per one surface of the positive current collector, and the arithmetic mean roughness Ra of the positive electrode was 0.692 μm. In addition, the cross section of the positive electrode was photographed using SEM, and the cross-sectional photograph was binarized, and the cross-sectional area ($S_{in}$) of the inner core portion and the cross-sectional area ($S_{out}$) of the surface layer portion were respectively measured. The volume $S_{in}$ of the inner core portion was 50 times larger than the volume $S_{out}$ of the surface layer portion. The mass ratio of PEDOT to polythiophene (the mass ratio of PEDOT/polythiophene) in the surface layer portion was 0.255.

Comparative Example 1

Electrochemical device (B1) was produced in the same manner as in Example 1 except that EDOT and thiophene were not added to the nonaqueous electrolytic solution (the surface layer portion was not formed).

Comparative Example 2

Electrochemical device (B2) was produced in the same manner as in Example 1 except that thiophene was not added to the nonaqueous electrolytic solution.

Comparative Example 3

Electrochemical device (B3) was produced in the same manner as in Example 1 except that EDOT was not added to the nonaqueous electrolytic solution.

[Evaluation]

(1) Low Temperature Properties

The initial capacitance at −10° C. and internal resistance of electrochemical devices A1 and B1 to B3 were measured. The results are shown in Table 1.

TABLE 1

| Electrochemical device | Configuration of surface layer portion | Capacitance (F) | Internal resistance (Ω) |
|---|---|---|---|
| A1 | PEDOT/Polythiophene | 12.9 | 0.9 |
| B1 | — | 7.0 | 3.5 |
| B2 | PEDOT | 9.0 | 1.9 |
| B3 | Polythiophene | 9.2 | 2.9 |

It can be seen that electrochemical device A1 containing PEDOT and polythiophene in the surface layer portion has a larger capacitance at −10° C., a smaller internal resistance, and superior low temperature properties as compared with electrochemical devices B1 to B3.

(2) Durability

The initial capacitance ($C_0$) at 60° C. and internal resistance ($R_0$) of electrochemical devices A1 and B3 were measured. Thereafter, the electrochemical devices were preserved at 60° C. for 1000 hours while a charging voltage of 3.5 V was applied thereto. The capacitance ($C_1$) and internal resistance ($R_1$) of the electrochemical devices after preservation were measured, and the retention of each of capacitance and internal resistance was calculated. The capacitance retention (%) was calculated by $C_1/C_0 \times 100$. The resistance retention (%) was calculated by $R_1/R_0 \times 100$. It is more preferable as the capacitance retention (%) is higher and it is more preferable as the resistance retention (%) is lower. The results are shown in Table 2.

TABLE 2

| Electrochemical device | Configuration of surface layer portion | Capacitance retention (%) | Resistance retention (%) |
|---|---|---|---|
| A1 | PEDOT/Polythiophene | 81 | 121 |
| B3 | Polythiophene | 60 | 194 |

It can be seen that electrochemical device A1 containing PEDOT and polythiophene in the surface layer portion is superior in capacitance retention and resistance retention to electrochemical device B3 containing only polythiophene in the surface layer portion, and thus electrochemical device A1 exhibits durability.

The electrochemical device according to the present invention can be suitably applied, for example, to applications required to have a higher capacitance than electric double layer capacitors and lithium ion capacitors and a higher output than lithium ion secondary batteries, particularly to applications used at low temperatures.

The invention claimed is:

1. A positive electrode for electrochemical device, the positive electrode comprising:
   a positive current collector; and
   a positive electrode material layer supported on the positive current collector, wherein:

the positive electrode material layer includes a positive electrode active material, the positive electrode active material including an inner core portion and a surface layer portion, the inner core portion contains polyaniline, the inner core portion being fibrous or grain-aggregate, and the surface layer portion contains poly(3,4-ethylenedioxythiophene) and polythiophene, the surface layer portion covering at least a part of the inner core portion.

2. The positive electrode for electrochemical device according to claim 1, wherein a mass ratio of poly(3,4-ethylenedioxythiophene) to polythiophene in the surface layer portion ranges from 0.02 to 20, inclusive.

3. The positive electrode for electrochemical device according to claim 1, wherein a volume of the inner core portion is more than or equal to a volume of the surface layer portion.

4. The positive electrode for electrochemical device according to claim 1, wherein an arithmetic mean roughness Ra of a surface of the positive electrode for electrochemical device ranges from 0.4 μm to 1.5 μm, inclusive.

5. An electrochemical device comprising:
   the positive electrode according to claim 1;
   a negative electrode including a negative electrode material layer that occludes and releases a lithium ion; and
   a nonaqueous electrolytic solution having lithium ion conductivity.

6. A method for manufacturing a positive electrode for electrochemical device, the method comprising:
   an inner core portion forming step of forming an inner core portion containing polyaniline on a positive current collector by using a first solution containing aniline, the inner core portion being fibrous or grain-aggregate; and
   a surface layer portion forming step of forming a surface layer portion containing poly(3,4-ethylenedioxythiophene) and polythiophene by using a second solution containing 3,4-ethylenedioxythiophene and thiophene after the inner core portion forming step, the surface layer portion covering at least a part of the inner core portion.

7. The method for manufacturing a positive electrode for electrochemical device according to claim 6, wherein:
   a concentration of 3,4-ethylenedioxythiophene in the second solution ranges from 0.1% to 1% by mass, inclusive, and
   a concentration of thiophene in the second solution ranges from 0.05% to 4% by mass, inclusive.

8. A method for manufacturing an electrochemical device that includes a positive electrode having a positive current collector and a positive electrode material layer supported on the positive current collector, a negative electrode including a negative electrode material layer that occludes and releases a lithium ion, and a nonaqueous electrolytic solution having lithium ion conductivity, the method comprising a step of forming the positive electrode,
   wherein the step of forming the positive electrode includes:
   an inner core portion forming step of forming an inner core portion containing polyaniline on the positive current collector by using a first solution containing aniline, the inner core portion being fibrous or grain-aggregate; and
   a surface layer portion forming step of forming a surface layer portion containing poly(3,4-ethylenedioxythiophene) and polythiophene by using the nonaqueous electrolytic solution containing 3,4-ethylenedioxythiophene and thiophene after the inner core portion forming step, the surface layer portion covering at least a part of the inner core portion.

9. The method for manufacturing an electrochemical device according to claim 8, wherein:
   the first solution contains the aniline and a dopant, and
   the method comprises a dedoping step of dedoping the dopant that has been doped in the polyaniline from the polyaniline after the inner core portion forming step and before the surface layer portion forming step.

* * * * *